D. E. THOMPSON.
ATTACHMENT FOR GRAIN BINDERS FOR TREATING BINDING TWINE.
APPLICATION FILED JAN. 22, 1919.

1,322,737.

Patented Nov. 25, 1919.

Inventor.
Dewey E. Thompson
By his Attorneys
Williamson Merchant

UNITED STATES PATENT OFFICE.

DEWEY E. THOMPSON, OF DAWSON, MINNESOTA.

ATTACHMENT FOR GRAIN-BINDERS FOR TREATING BINDING-TWINE.

1,322,737.     Specification of Letters Patent.     Patented Nov. 25, 1919.

Application filed January 22, 1919. Serial No. 272,562.

*To all whom it may concern:*

Be it known that I, DEWEY E. THOMPSON, a citizen of the United States, residing at Dawson, in the county of Lac qui Parle and State of Minnesota, have invented certain new and useful Improvements in Attachments for Grain-Binders for Treating Binding-Twine; and I do hereby declare the following to be a full, clear, and exact description of the invention, such as will enable others skilled in the art to which it appertains to make and use the same.

My invention has for its object to provide an attachment for grain binders, whereby the binding twine, as taken up by the needle, may be subjected to a preserving treatment to protect the same primarily from being destroyed by vermin. As is well known, in certain sections of the country, crickets, during the time between the harvesting and the threshing of grain, will eat through the binding twine, and thereby loosen the grain, while standing in shocks or stacks, or they will eat part way through the binding twine, and thereby cause the same to break while the bundles are being handled in stacking or while feeding the same to a threshing machine. Obviously, the cutting or breaking of the binding twine will not only cause a loss in grain, but also a loss in time, in handling the same. Attempts have been made to treat binding twine, at the time the same is manufactured, to protect the same against vermin, but the lapse of time between the manufacture and use of the binding twine is such that the treatment is ineffective by the time the binding twine is used. To overcome this difficulty, I provide an attachment for grain binders, whereby the binding twine, as previously stated, is subjected to a preserving treatment, so the same is taken up by the needle. By thus applying the treatment, at the time the binding twine is used, the same will remain effective against vermin, during the time between harvesting and threshing.

To the above end, the invention consists of the novel devices and combinations of devices hereinafter described and defined in the claim.

In the accompanying drawings, which illustrate the invention, like characters indicate like parts throughout the several views.

Referring to the drawings:—

Figure 1:
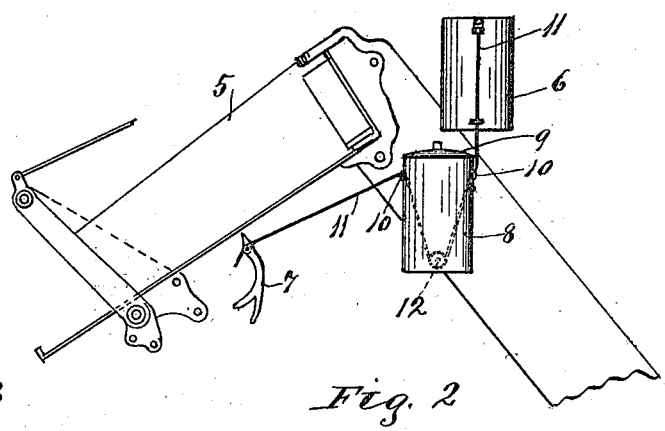
Figure 1 is a fragmentary view of the grain binder having the improved attachment applied thereto.
Figure 3:
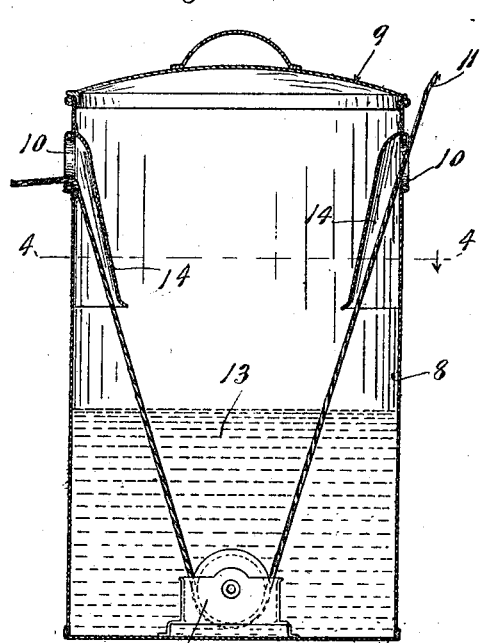
Fig. 3 is a view in vertical section taken on the line 3—3 of Fig. 2.
Figure 2:
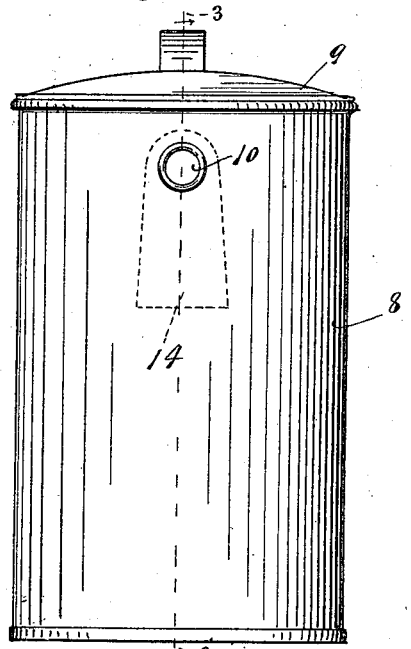
Fig. 2 is a side elevation of the attachment.
Figure 4:
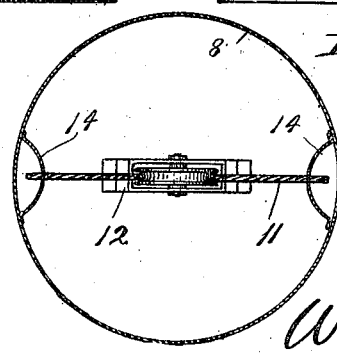
Fig. 4 is a transverse section taken on the line 4—4 of Fig. 3.

The numeral 5 indicates a portion of a grain binder and the numerals 6 and 7 indicate, respectively, the twine holder and the needle. Located between the twine holder 6 and needle 7, is a tank 8 rigidly secured to the binder by any suitable means and having a displaceable cover 9. Formed in the tank 8, near the top thereof, is a pair of diametrically opposite guide eyes 10, through which the binding twine 11 passes, as the same is drawn from the holder 6 by the needle 7. Secured to the bottom of the tank 8, is a guide sheave 12, under which the binding twine 11 passes to direct the same through a liquid 13 within said tank, during its passage through the guide eyes 10. To prevent the liquid 13 from splashing through the eyes 10, I provide the same with depending shields 14 secured to the inner walls of the tank 8.

Obviously, as the needle 7 draws the binding twine 11 from the holder 6, the same is caused to pass through the liquid 13 and is saturated therewith. For the purpose of this case, it will not be necessary to disclose the nature of the liquid with which the binding twine is treated, but it is sufficient to state that it is of a nature to prevent crickets or other vermin from eating the binding twine.

From the above description, it is evident that the attachment may be very easily and quickly applied to a grain binder, without changing or effecting any of the parts thereof. The attachment also acts, to a certain extent, as a tension device for the binding twine in its passage from the holder 6 to the needle 7.

What I claim is:—

A cover equipped liquid-holding tank, a pair of twine guide-eyes in the sides of the tank above the liquid level, and splash shield extending below and over said guide-eyes.

In testimony whereof I affix my signature in presence of two witnesses.

DEWEY E. THOMPSON.

Witnesses:
   CHAS. O. HILL,
   FRANK M. FLEINZEN.